(12) United States Patent
Ho et al.

(10) Patent No.: US 11,383,195 B2
(45) Date of Patent: Jul. 12, 2022

(54) DEVICE FOR CAPTURING PARTICLES

(71) Applicant: Industrial Technology Research Institute, Hsin-Chu (TW)

(72) Inventors: Tsung-Jen Ho, Hsinchu County (TW); Sheng-Fu Huang, Hsinchu County (TW); Yen-Chun Liu, Hsinchu (TW); Chun-Yi Chou, Keelung (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 208 days.

(21) Appl. No.: 16/904,877

(22) Filed: Jun. 18, 2020

(65) Prior Publication Data

US 2021/0154616 A1    May 27, 2021

Related U.S. Application Data (60) Provisional application No. 62/938,463, filed on Nov. 21, 2019.

(30) Foreign Application Priority Data

Dec. 30, 2019  (TW) .................................. 108148409

(51) Int. Cl.
*B01D 47/05*  (2006.01)
*B01D 5/00*  (2006.01)
(Continued)

(52) U.S. Cl.
CPC ............... *B01D 47/05* (2013.01); *B01D 3/18* (2013.01); *B01D 5/0015* (2013.01); *B01D 53/002* (2013.01)

(58) Field of Classification Search
None
See application file for complete search history.

(56) References Cited

U.S. PATENT DOCUMENTS

| 1,110,868 A | * | 9/1914 | Bauer | B01D 47/02 |
|---|---|---|---|---|
| | | | | 96/321 |
| 1,493,579 A | * | 5/1924 | Walter | B01D 47/06 |
| | | | | 95/200 |

(Continued)

FOREIGN PATENT DOCUMENTS

| CN | 102961943 B | 3/2015 |
|---|---|---|
| CN | 104740889 A | 7/2015 |

(Continued)

OTHER PUBLICATIONS

Ding, Li et al., Exploitation of Down Flow Cyclone Separator Properties and Industrial Application, Coal Chemical Industry, Journal No. 3 (Total No. 100), College of Chemical and Pharmaceutical Engineering, Qingdao Institute of Chemical Technology, Qingdao 266042, Jun. 2002. English abstract on p. 1.

(Continued)

*Primary Examiner* — Christopher P Jones
*Assistant Examiner* — Phillip Y Shao
(74) *Attorney, Agent, or Firm* — WPAT, PC (57) ABSTRACT

A device for capturing particles includes a gas-guiding unit, a gas-guiding unit and a mist-elimination unit. The gas-guiding unit has opposing first and second ends. The mist-elimination unit is disposed at the second end. The liquid-circulation unit, disposed under the mist-elimination unit by surrounding the gas-guiding unit, includes through holes below the gas-guiding unit by a gap. A gas containing particles enters the channel via the first end and then the mist-elimination unit via the second end. While the gas flows into the channel, the liquid in the liquid-circulation unit is inhaled into the channel via the gap to form droplets containing particles. After the droplets are captured by the mist-elimination unit, the liquid formed at the mist-elimination unit flows down into the liquid-circulation unit to (Continued)

reform the liquid to be further inhaled back to the channel of the gas-guiding unit via the gap.

15 Claims, 6 Drawing Sheets

(51) Int. Cl.
  *B01D 53/00* (2006.01)
  *B01D 3/18* (2006.01)

(56) References Cited

U.S. PATENT DOCUMENTS

| | | | | |
|---|---|---|---|---|
| 3,050,447 | A * | 8/1962 | Olney | B01D 47/02 |
| | | | | 208/92 |
| 3,957,464 | A * | 5/1976 | Teller | B01D 47/12 |
| | | | | 95/224 |
| 3,960,507 | A * | 6/1976 | Tsujikawa | B01D 53/56 |
| | | | | 261/DIG. 9 |
| 4,023,938 | A * | 5/1977 | Guth | C01B 17/56 |
| | | | | 95/224 |
| 4,374,813 | A * | 2/1983 | Chen | B01D 47/06 |
| | | | | 423/243.08 |
| 4,589,889 | A * | 5/1986 | Spencer | B01D 53/14 |
| | | | | 95/174 |
| 4,619,693 | A * | 10/1986 | Takai | F27D 17/008 |
| | | | | 266/88 |
| 5,123,936 | A * | 6/1992 | Stone | B01D 50/60 |
| | | | | 96/57 |
| 5,599,508 | A | 2/1997 | Martinelli et al. | |
| 5,660,615 | A * | 8/1997 | Neumann | B01D 47/12 |
| | | | | 95/224 |
| 5,759,233 | A * | 6/1998 | Schwab | B01D 47/12 |
| | | | | 261/DIG. 54 |
| 5,972,171 | A | 10/1999 | Ross et al. | |
| 6,235,256 | B1 * | 5/2001 | Lang | B01D 53/504 |
| | | | | 423/220 |
| 6,322,763 | B1 * | 11/2001 | McDaniel | B01D 53/8603 |
| | | | | 423/242.1 |
| 6,953,495 | B2 * | 10/2005 | Schwab | B01D 47/10 |
| | | | | 95/224 |
| 8,025,860 | B1 * | 9/2011 | Diamond | B01D 53/8637 |
| | | | | 95/137 |
| 8,394,179 | B2 | 3/2013 | Smith et al. | |
| 10,300,429 | B2 | 5/2019 | Grave et al. | |
| 2010/0101414 | A1 | 4/2010 | Smith et al. | |
| 2015/0241059 | A1 * | 8/2015 | Oishi | B01D 53/002 |
| | | | | 423/220 |
| 2016/0303502 | A1 * | 10/2016 | Higgins | B01D 47/05 |

FOREIGN PATENT DOCUMENTS

| | | |
|---|---|---|
| CN | 204522628 U | 8/2015 |
| CN | 204619718 U | 9/2015 |
| CN | 105148701 A | 12/2015 |
| CN | 205055629 U | 3/2016 |
| CN | 205699814 U | 11/2016 |
| CN | 106582163 A | 4/2017 |
| CN | 104368217 B | 5/2017 |
| CN | 208244389 U | 12/2018 |
| CN | 208275221 U | 12/2018 |
| CN | 208302457 U | 1/2019 |
| CN | 109331634 A | 2/2019 |
| TW | 279137 | 6/1996 |
| TW | 478960 B | 3/2002 |
| TW | M271620 U | 8/2005 |
| TW | 200841925 | 11/2008 |
| TW | M470220 U | 1/2014 |
| TW | I511771 | 12/2015 |
| TW | I574726 | 3/2017 |
| TW | I588098 B | 6/2017 |
| TW | I630299 B | 7/2018 |
| TW | I651276 B | 2/2019 |

OTHER PUBLICATIONS

Jiang Jin-He et al. Flow Field Simulation of Straight Down Flow Film Cyclone Separator, Fluid Machinery, pp. 29-32, vol. 35, No. 5, 2007. Qingdao University of Science & Technology, Qingdao, 266042, Chian. English abstract on p. 1.

Ji, Long-Fei, Operation mode optimization of demister in flue gas wet desulfurization, 2013 Conference on comprehensive utilization of resources in power generation industry, Shanxi Jingyu Power Generation Co., Ltd, Aug. 2013, Lijiang, China. English abstract on p. 1.

Wang, Ye et al., Optimization on pretreatment of Industrial SO2 exhaust gas, Chemical Engineering (China), Oct. 2015, vol. 43, No. 10, pp. 16-20. English abstract on p. 1.

Taiwan Intellectual Property Office, Office Action dated May 18, 2020.

* cited by examiner

DEVICE FOR CAPTURING PARTICLES

CROSS REFERENCE TO RELATED APPLICATION

This application claims the benefits of U.S. provisional application Ser. No. 62/938,463 filed on Nov. 21, 2019, and Taiwan application Serial No. 108148409 filed on Dec. 30, 2019, the disclosures of which are incorporated by references herein in its entirety.

TECHNICAL FIELD

The present disclosure relates in general to a device for capturing particles, and more particularly to the capturing device that can collect effectively particles from an exhaust gas.

BACKGROUND

For different manufacturing fields such as semiconductor and optoelectronic industries, generation of some acidic and/or alkaline gases are inevitably generated in various manufacturing processes. Generally, a wet scrubber is usually applied to handle these acidic and/or alkaline gases.

In the art, a conventional wet scrubber can only provide limited capacity for handling low-concentrated inorganic exhaust gas, micro particles and droplets. In particular, for handling particles and droplets having a diameter less than 2 μm, the conventional wet scrubber is hard to provide a satisfied performance. In some examples, specific particles such as salt granules would be easy to be accumulated and thus jam the device, and from which poor defogging can be foreseen. In addition, with a huge amount of particulate matters emitted into the atmosphere, severe air pollution would occur. In this disclosure, the term "particles" can stand for salt granules soluble in water, solid matters insoluble in water, or a combination of the foregoing two matters.

In the art, type of mist eliminator applicable to conventional scrubbers can be classified in Table 1 as follows.

TABLE 1

| | Type | | |
|---|---|---|---|
| | Fiber demister | Wire Mesh demister | Vane/Chevron demister |
| Occupation | Large space, Independent installation | Less space, inside the scrubber | Less space, inside the scrubber |
| Upper bound of superficial velocity | ~0.5 m/s | ~2.8 m/s | ~5.0 m/s |
| Pressure drop (under the above mentioned superficial velocity) | 200~300 mm $H_2O$ | 100~150 mm $H_2O$ | 50~100 mm $H_2O$ |
| Droplets/Particles capture range | >1 μm | >10 μm | >100 μm |

As listed in Table 1, though the fiber demister can capture droplets/particles having a diameter about 1 μm, yet the superficial velocity through the fiber demister shall not exceed 0.5 m/s. Hence, the fiber demister needs to occupy more space. On the other hand, each of the mesh and vane/chevron demisters is defined with a larger upper bound of superficial velocity and a smaller occupation. However, since only droplets/particles with specific sizes can be surely captured, thus technical difficulty exists in handling the droplets/particles having a diameter less than 10 μm.

Currently, to the granular pollutants (droplets/particles) with diameters less than 2 μm and there is a demister thereinside, which is easily blocked by accumulated particles such as salt granules Thus, beside a poor defogging performance, the current wet scrubber also emits a large amount of particulate matters into the atmosphere, and therefore to induce severe air pollution.

Accordingly, an improved device for capturing particles that can collect effectively particles from exhaust gases, avoid accumulation, jam or emission of particulate matters to further cause air pollution, and occupy less space is urgent.

SUMMARY

In one embodiment of this disclosure, a device for capturing particles includes a gas-guiding unit, a mist-elimination unit and a liquid-circulation unit. The gas-guiding unit has a channel with a first end and a second end opposing the first end. The mist-elimination unit is disposed at the second end of the gas-guiding unit. The liquid-circulation unit, disposed under the mist-elimination unit by surrounding the gas-guiding unit, is furnished with a through hole below the gas-guiding unit, a gap being formed between the gas-guiding unit and the liquid-circulation unit.

In this embodiment, a gas containing particles is introduced into the channel of the gas-guiding unit via the first end, and then to enter the mist-elimination unit via the second end; wherein, while the gas flows into the channel of the gas-guiding unit, the liquid in the liquid-circulation unit is inhaled into the channel of the gas-guiding unit via the gap to have the particles in the gas to be contained into the liquid so as to form droplets to be captured. After the droplets to be captured are captured by the mist-elimination unit, the liquid formed at the mist-elimination unit by capturing the droplets to be captured flows down into the liquid-circulation unit to reform the liquid in the liquid-circulation unit, and then the liquid is inhaled back to the channel of the gas-guiding unit via the gap.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
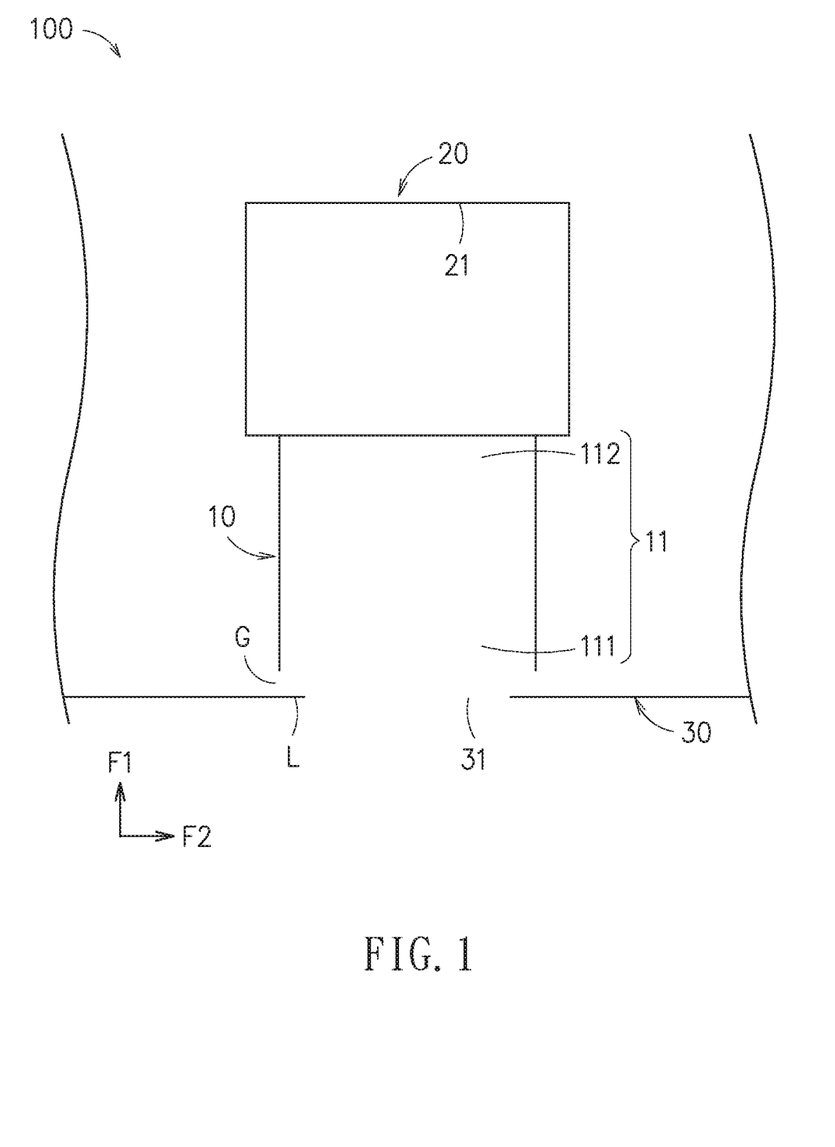
FIG. 1 is a schematic front view of an embodiment of the device for capturing particles in accordance with this disclosure.

Referring to FIG. 1, a device for capturing particles 100 includes a gas-guiding unit 10, a mist-elimination unit 20 and a liquid-circulation unit 30. In this embodiment, the particles can be soluble salt granules, insoluble solid matters, a combination of the aforesaid two, and/or particles contained in droplets.

The gas-guiding unit 10 has a first end 111 and a second end 112 opposing the first end 111. A channel 11 is formed by connecting spatially the first end 111 and the second end 112. As shown, in comparison with the second end 112, the first end 111 is located closer to the liquid-circulation unit 30. In this embodiment, the channel 11 can be arbitrarily shaped, such as a regular or irregular, circular or polygonal hollow column, and the channel 11 is extended in a direction parallel to a first direction F1.

The mist-elimination unit 20 is disposed at the second end 112 of the gas-guiding unit 10. In one embodiment, the mist-elimination unit 20 having a top end plate 21 is used for capturing the liquid carried by the passing gas, in particular by dropping the liquid onto the liquid-circulation unit 30 through gravity.

The liquid-circulation unit 30 is disposed to surround, mainly under, the gas-guiding unit 10 and the mist-elimination unit 20. In this embodiment as shown in FIG. 1, the liquid-circulation unit 30 is constructed peripherally to surround both the gas-guiding unit 10 and the mist-elimination unit 20, with a complete coverage upon the gas-guiding unit 10. For the liquid-circulation unit 30 to surround the gas-guiding unit 10, a through hole 31 is furnished to a surface of the liquid-circulation unit 30, and the gas-guiding unit 10 is located right above the through hole 31. The mist-elimination unit 20 is disposed on top of the gas-guiding unit 10. In another embodiment not shown herein, the liquid-circulation unit 30 is furnished with a plurality of through holes 31, and each of the through holes 31 is furnished thereabove a gas-guiding unit 10 and a mist-elimination unit 20.

A shape of the through hole 31 on the surface of the liquid-circulation unit 30 is not limited to a specific shape, but can be a regular or irregular circle or geometric polygon. The shape of the through hole 31 and the shape of the channel 11 can be different. For example, the through hole 31 and the channel 11 can be both rectangular or circular, or the through hole 31 is shaped to be a circle while the channel 11 is shaped to be a rectangle.

As shown in FIG. 1, a gap G ranging from 3~20 mm exists at a junction between the gas-guiding unit 10 and the liquid-circulation unit 30.

In this embodiment, the liquid-circulation unit 30 includes a collecting plate L located under the first end 111 of the channel 11. In particular, the collecting plate L located below the gap G is parallel to a second direction F2, and protrudes into the channel 11 by a length, in which the second direction F2 is perpendicular to the first direction F1.

Figure 2:
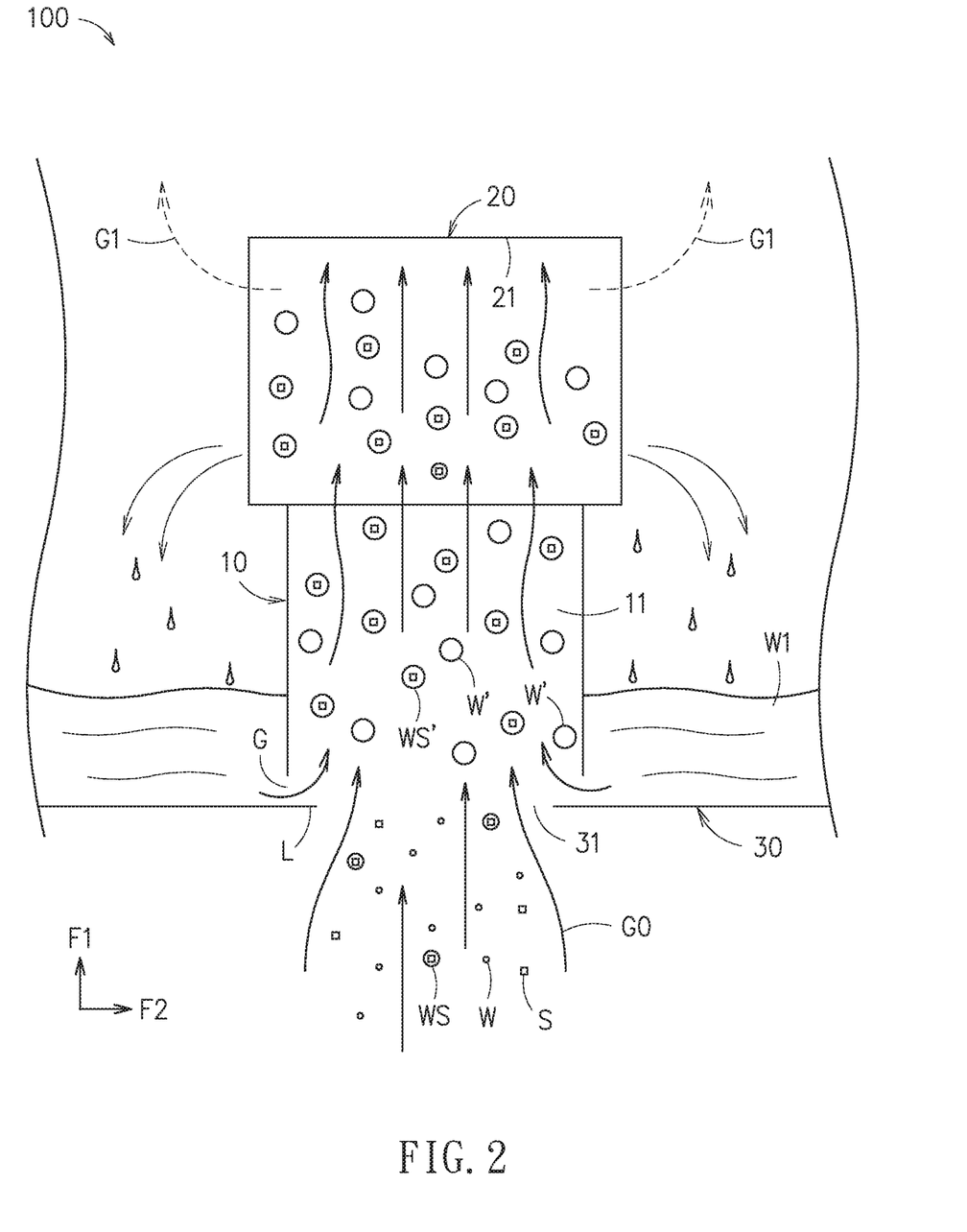
FIG. 2 is a schematic view showing the embodiment of FIG. 1 in a state of collecting particles.

Referring to FIG. 2, a gas G0 flows in the first direction F1 to enter the channel 11 via the through hole 31 and the first end 111, and then further to reach the mist-elimination unit 20. Generally speaking, the gas G0 can include solid particles S, foggy or liquid first droplets W containing no particles, or second droplets WS containing particles.

In this embodiment, the gas G0 enters the gas-guiding unit 10 via the first end 111, flows through the channel 11, and finally enters the mist-elimination unit 20. When the gas G0 flows into the channel 11 of the gas-guiding unit 10, the liquid W1 in the liquid-circulation unit 30 would be inhaled or sucked automatically into the channel 11 through the gap G to further mix the gas G0. Thereupon, the first droplets W containing no particles would grow into the bigger third droplets W', and the second droplets WS containing particles would grow into bigger droplets to be captured WS'. Part of the third droplets W' would further send the particles S in the gas G0 into the droplets to be captured WS' containing particles.

In one embodiment, the diameter of the first droplet W and the second droplet WS is smaller than another diameter of the third droplet W' and the droplet to be captured WS'. In particular, the diameter of the third droplet W' or the droplet to be captured WS' is no less than 2 μm.

Then, after the droplets to be captured WS' and the third droplets W' are captured at the mist-elimination unit 20, these captured droplets WS' and W' would flow down along lateral sides of the mist-elimination unit 20 via gravity, and finally drop into the liquid-circulation unit 30. After the collection at the liquid-circulation unit 30 to reform the liquid W1, the liquid W1 would be then inhaled into the channel 11 again via the gap G. Thereupon, a circulation of the liquid W1 is formed.

To realize the aforesaid circulation, an internal pressure drop would exist inside the channel 11 of the gas-guiding unit 10, and the gas G0 has a specific superficial velocity. Through an appropriate match of the pressure drop and the superficial velocity, the liquid W1 in the liquid-circulation unit 30 can be inhaled into the channel 11 via the gap G. Thus, while the first droplets W and the second droplets WS enters the channel 11, the third droplets W' and the droplets to be captured WS' with larger diameters would be formed inside the channel 11, and be raised up to enter the mist-elimination unit 20.

It shall be explained that, in FIG. 2, the gas G0 includes the solid particles S, the first droplets W in a foggy or liquid state, and the second droplets WS containing particles. However, according to this disclosure, the aforesaid embodiment can be also applied to the gas G0 containing the particles S only, and the mist-elimination unit 20 can be used for capturing the particles S from the gas G0.

In this disclosure, the aforesaid pressure drop is not specifically restrictions but depends on the practical requirements. For example, the pressure drop can be ranging from 80~250 $mmH_2O$, and the gas G0 entering the channel 11 from the first end 111 can have a superficial velocity ranging from 16~28 m/s, such that the pressure drop is sufficient for the gas G0 through the channel 11 without dropping down the liquid W1 inhaled into the channel 11 through the gap G.

If any of the third droplets W' and the droplets to be captured WS' fails to flow into the liquid-circulation unit 30 but drops directly down into the channel 11 from the mist-elimination unit 20, the collecting plate L can be used for collecting the droplets W' or WS' flowing down along the channel 11. These collected droplets would be recycled back to the channel 11 along with the liquid W1 inhaled into the channel 11 via the gap G.

Figure 3:
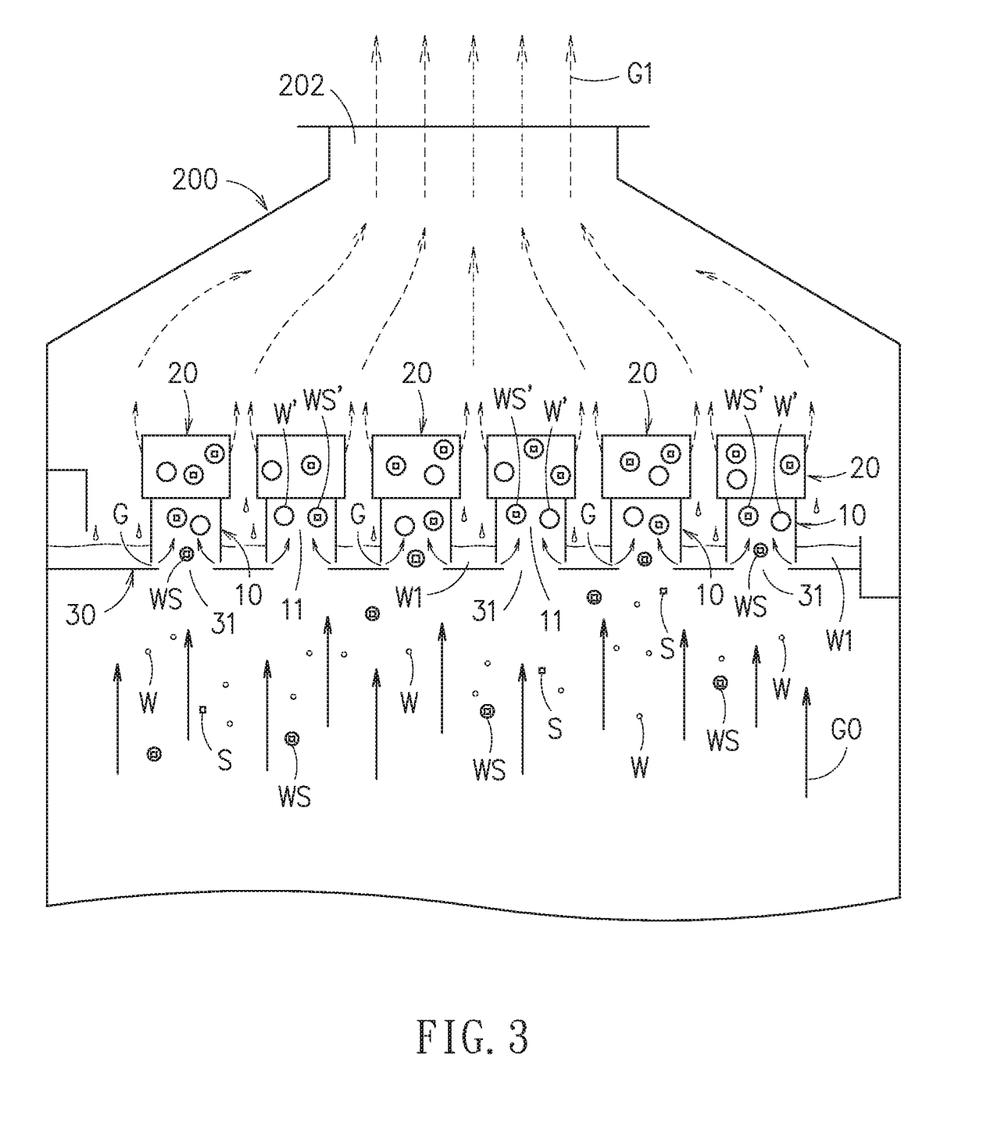
FIG. 3 is a schematic view of the embodiment of FIG. 1 applied inside a scrubber.
Figure 4:
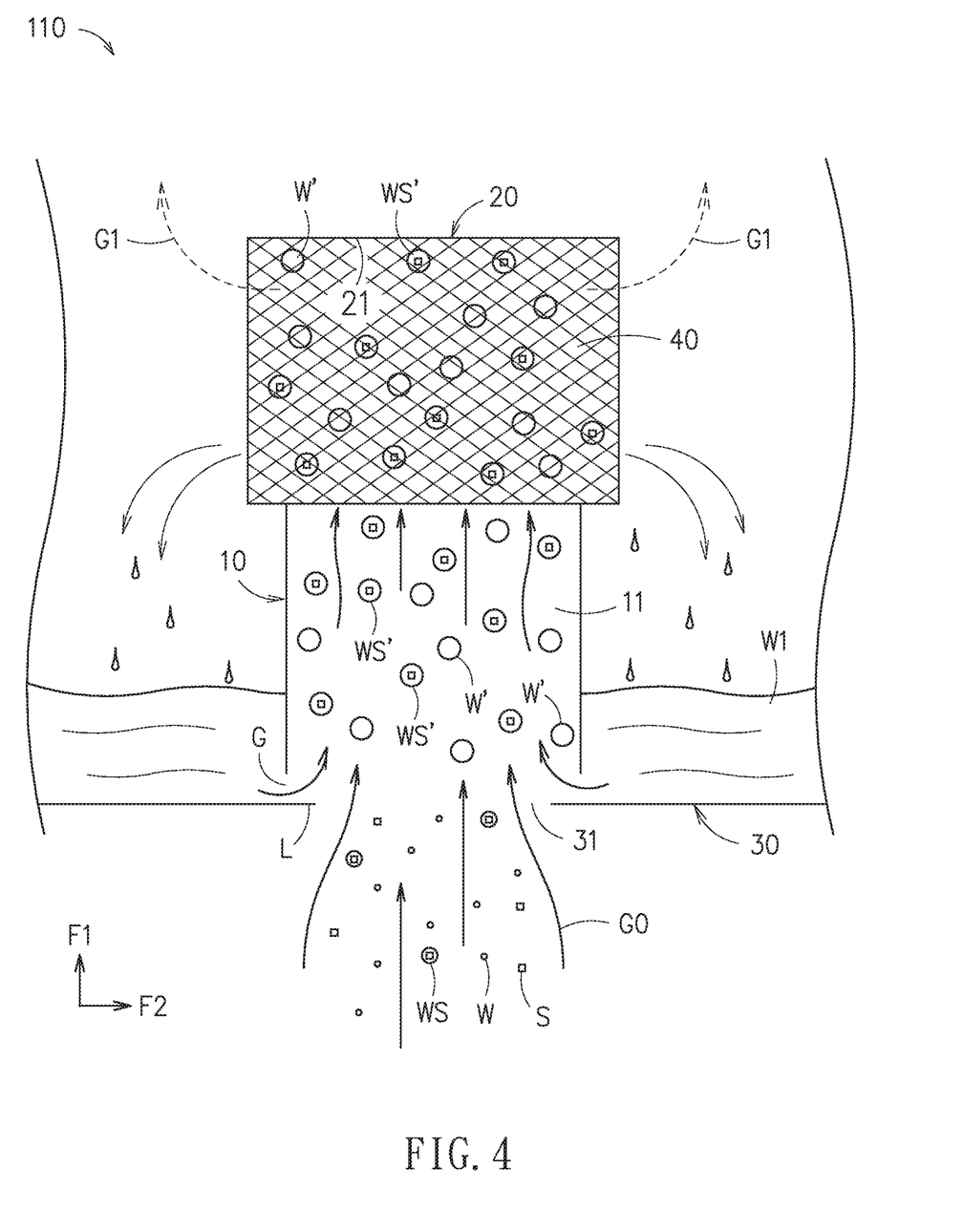
FIG. 4 is a schematic front view of another embodiment of the device for capturing particles in accordance with this disclosure.
Figure 5A:
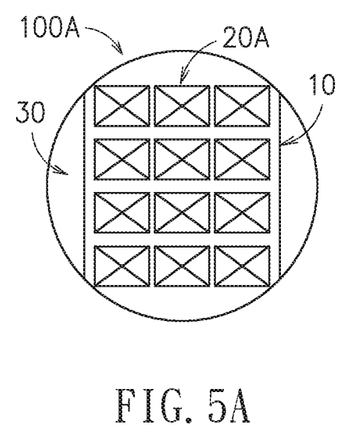
FIGS. 5A-5H demonstrate schematically top views of various exemplary examples in accordance with this disclosure.
Figure 5B:
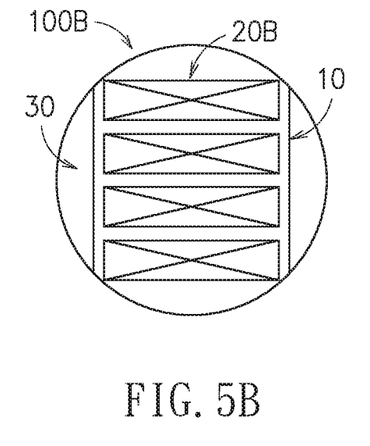
Figure 5C:
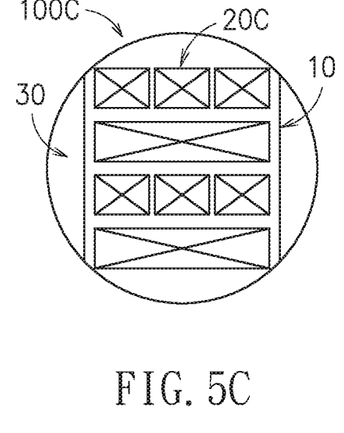
Figure 5D:
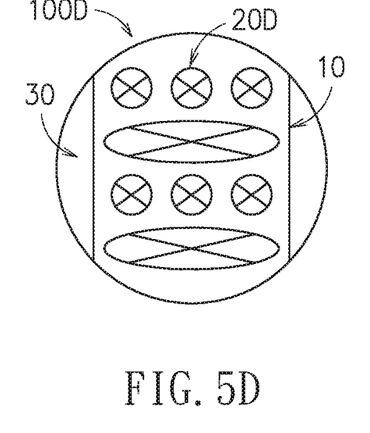
Figure 5E:
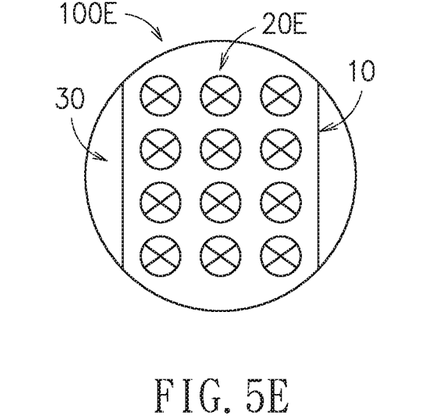
Figure 5F:
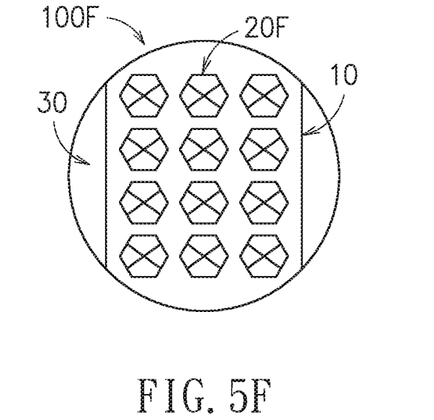
Figure 5G:
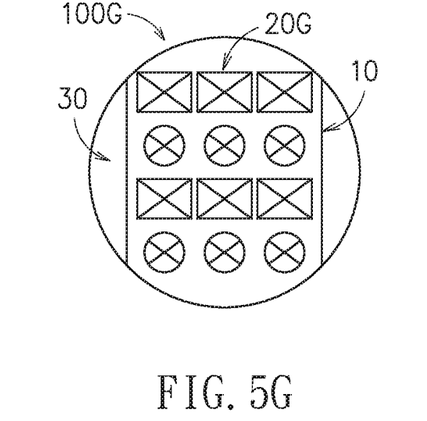
Figure 5H:
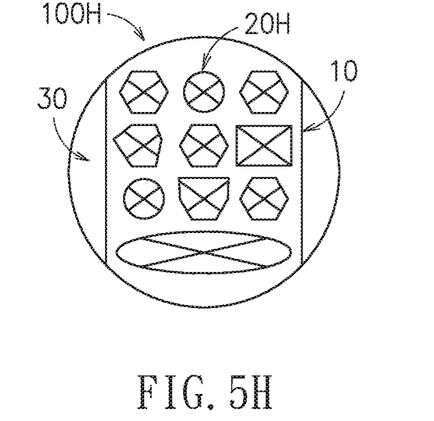

Referring to FIG. 3, in this embodiment, the liquid-circulation unit 30 is disposed inside a scrubber 200. A ventilation opening 202 is furnished to a top of the scrubber 200. On a surface of the liquid-circulation unit 30, a plurality of through holes 31 are provided. Every through hole 31 is designed relevantly to pair a gas-guiding unit 10 located right above the respective through hole 31, and further one individual mist-elimination unit 20 is provided correspondingly to top the respective gas-guiding unit 10.

In FIG. 3, the gas G0 flows upward to pass through the liquid-circulation unit 30 via these through holes 31, enters each of the gas-guiding units 10, and then enters the corresponding mist-elimination units 20 through the respective gas-guiding units 10. While the gas G0 flows into the channels 11 of the respective gas-guiding units 10, the liquid W1 in the liquid-circulation unit 30 would be inhaled into the channels 11 via the gaps to mix the gas G0, such that the first droplets W containing no particles would grow into bigger third droplets W', and the second droplets WS containing particles would grow into bigger droplets to be captured WS'. In addition, part of the third droplets W' would further capture the particles S in the gas G0 so as to form the droplets to be captured WS' containing particles. Then, after the droplets to be captured WS' and the third droplets W' are captured by the mist-elimination units 20, they would flow down to the liquid-circulation unit 30 by gravity along lateral sides of the mist-elimination units 20. After the drop-down droplets are collected by the liquid-circulation unit 30 to form the liquid W1, the liquid W1 would be then recycled back to the channels 11 through the respective gaps G.

It shall be explained that, in FIG. 3, the gas G0 includes the solid particles S, the first droplets W in a foggy or liquid state, and the second droplets WS containing particles. However, according to this disclosure, the aforesaid embodiment can be also applied to the gas G0 containing the particles S only, and the mist-elimination units 20 can be used for capturing the particles S from the gas G0.

Referring to FIG. 4, in another embodiment of this disclosure, the device for capturing particles 110 includes a gas-guiding unit 10, a mist-elimination unit 20 and a liquid-circulation unit 30.

In this embodiment, besides having a top end plate 21, the mist-elimination unit 20 further has a packing material 40 regularly or irregularly disposed inside the mist-elimination unit 20. According to this disclosure, the type, material and shape of the packing material 40 are not specifically restrictions. For example, the packing material 40 can be chevron plates, regular or irregular packed structured packing, or random packing. The packing material can be made of plastics, metal or a combination of the aforesaid materials. The packing material 40 can be different structures according to sizes of the droplets to be captured. For example, the packing material 40 can be a wire mesh, a plate, or a combination of the aforesaid two.

In this embodiment, the method for capturing droplets and particles contained inside the droplets can be the same as that for the embodiment of FIG. 2. Therefore, there is no need to repeat the details. Importantly, the mist-elimination unit 20 of FIG. 4 and that of FIG. 2 might be slightly different, but, anyway, both of them can be used for capturing particles from the gas G0.

Referring to FIGS. 5A~5H, each of the devices for capturing particles 100A~100H includes a gas-guiding unit 10, a mist-elimination unit 20A~20H and a liquid-circulation unit 30. As shown in FIG. 5A~5H, the major difference among these devices for capturing particles 100A~100H is the pattern of the mist-elimination unit 20A~20H. The pattern for the mist-elimination unit 20A~20H according to this disclosure can be rectangles, circles, ellipses, regular polygons, irregular polygons and arbitrary combinations of aforesaid shapes with different dimensions.

In summary, in the device for capturing particles provided by this disclosure, with the appropriate pressure drop in the channel of the gas-guiding unit and the appropriate superficial velocity of the gas containing particles, so that liquids and gases inside the channel can be well mixed to produce a great amount of larger-size droplets or foggy drops. Then, with the mist-elimination unit to capture these larger-size droplets and foggy drops, the particles in the gas can be captured. In addition, the superficial velocity of the gas can be varied to control the size of the mixed droplets, such that the capture ratios of collecting the particles can be relevantly controlled.

With respect to the above description then, it is to be realized that the dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A device for capturing particles, comprising:

a gas-guiding unit, having a channel with a first end and a second end opposing the first end;

a mist-elimination unit, disposed at the second end of the gas-guiding unit; and a liquid-circulation unit, disposed under the mist-elimination unit by surrounding the gas-guiding unit, furnished with a through hole disposed below the gas-guiding unit, a gap being formed between the gas-guiding unit and the liquid-circulation unit, wherein the liquid-circulation unit is furnished with a collecting plate disposed close to the first end of the channel by protruding a length thereof into the channel below the gap;

wherein a gas containing particles is introduced into the channel of the gas-guiding unit via the first end, and then to enter the mist-elimination unit via the second end;

wherein, while the gas flows into the channel of the gas-guiding unit, a liquid in the liquid-circulation unit is inhaled into the channel of the gas-guiding unit via the gap, and the particles in the gas are merged with the liquid so as to form droplets to be captured;

wherein, after the droplets to be captured are captured by the mist-elimination unit, the droplets to be captured flow down to the liquid-circulation unit by gravity along lateral sides of the mist-elimination units, and after the droplets to be captured are collected by the liquid-circulation unit to form the liquid, the liquid is recycled back to the channel through the gap.

2. The device for capturing particles of claim 1, wherein the through hole is shaped to be a regular or irregular circle or polygon.

3. The device for capturing particles of claim 1, further including wherein the through hole is one of a plurality of through holes provided to the liquid-circulation unit, each of the plurality of through holes being furnished thereabove with one said corresponding gas-guiding unit.

4. The device for capturing particles of claim 3, wherein each of the plurality of through holes is shaped to be a regular or irregular circle or polygon.

5. The device for capturing particles of claim 1, wherein the gap is ranging from 3-20 mm.

6. The device for capturing particles of claim 1, wherein the channel of the gas-guiding unit has an internal pressure drop for inhaling the liquid in the liquid-circulation unit into the channel via the gap.

7. The device for capturing particles of claim 6, wherein the pressure drop is ranging from 80-250 mm $H_2O$, and the gas with droplets flows into the channel from the first end at a superficial velocity ranging from 16-28 m/s.

8. The device for capturing particles of claim 1, wherein the channel is shaped to be a regular or irregular circular or polygonal hollow column.

9. The device for capturing particles of claim 1, wherein the particles are solid particles or droplets containing particles.

10. The device for capturing particles of claim 1, wherein the droplets to be captured have diameters no less than 2 μm.

11. The device for capturing particles of claim 1, wherein the gas entering the channel further includes first droplets containing no said particles and having diameters less than 1 μm.

12. The device for capturing particles of claim 11, wherein third droplets having diameters no less than 2 μm are formed by mixing the first droplets entering the channel and the liquid inhaled into the channel through the gap.

13. The device for capturing particles of claim 1, wherein the gas entering the channel further includes second droplets containing the particles and having diameters less than 1 μm.

14. The device for capturing particles of claim 13, wherein the droplets to be captured are formed by mixing the second droplets entering the channel and the liquid inhaled into the channel through the gap.

15. The device for capturing particles of claim 1, wherein the mist-elimination unit has a packing material, disposed regularly or irregularly inside and shaped regularly or irregularly.

* * * * *